(12) United States Patent
Merlo et al.

(10) Patent No.: US 7,294,428 B2
(45) Date of Patent: Nov. 13, 2007

(54) METHOD FOR REUSING CURRENT COLLECTORS/DISTRIBUTORS OF SOLID POLYMER ELECTROLYTE FUEL CELL STACKS

(75) Inventors: Luca Merlo, Montorfano (IT); Gabriele Mazzucchelli, Milan (IT); Gian Piero Fleba, Milan (IT); Enrico Ramunni, S. Donato Milanese (IT); Giampaolo Brignoli, Milan (IT); Paolo Monzani, Milan (IT); Massimo Brambilla, Bussero (IT)

(73) Assignee: Nuvera Fuel Cells Europe S.r.l., Milan (IT)

( * ) Notice: Subject to any disclaimer, the term of this patent is extended or adjusted under 35 U.S.C. 154(b) by 622 days.

(21) Appl. No.: 10/493,930

(22) PCT Filed: Nov. 8, 2002

(86) PCT No.: PCT/EP02/12516

§ 371 (c)(1),
(2), (4) Date: Apr. 23, 2004

(87) PCT Pub. No.: WO03/041205

PCT Pub. Date: May 15, 2003

(65) Prior Publication Data

US 2004/0241533 A1    Dec. 2, 2004

(30) Foreign Application Priority Data

Nov. 8, 2001   (IT) .......................... MI2001A2342

(51) Int. Cl.
*H01M 8/02* (2006.01)

(52) U.S. Cl. ............................. 429/49; 429/35; 429/38; 29/402.08

(58) Field of Classification Search .................. 429/34, 429/35, 38, 39, 49; 29/403.03, 403.04, 403.08, 29/402.03, 402.04, 402.08
See application file for complete search history.

(56) References Cited

U.S. PATENT DOCUMENTS

| | | | |
|---|---|---|---|
| 5,454,925 A * | 10/1995 | Garland et al. | ...... 29/402.08 X |
| 5,534,362 A | 7/1996 | Okamoto et al. | |
| 5,565,072 A | 10/1996 | Faita et al. | |
| 5,876,583 A * | 3/1999 | Brambilla et al. | ........ 429/49 X |
| 5,958,211 A * | 9/1999 | Traini et al. | ......... 29/402.03 X |

\* cited by examiner

*Primary Examiner*—Stephen J. Kalafut
(74) *Attorney, Agent, or Firm*—Finnegan, Henderson, Farabow, Garrett & Dunner LLP (57) ABSTRACT

The method for reusing current collectors/distributors is employed in an electrochemical generator (1, 20) comprising a multiplicity of elementary cells (2, 21) assembled in a filter-press configuration and comprising an array of conductive sheets (3) and of current collectors/distributors (7, 22). The method of the invention provides dissembling the electrochemical generator (1) once the presence of a damaged elementary cell (2, 21) is detected. Subsequently, the method of the invention provides repairing/replacing the damaged cell for later reassembling the electrochemical generator (1, 20) reusing the original current collectors/distributors (7, 22). to achieve this, while reassembling the electrochemical generator (1, 20), a mechanical means for adapting (8, 12, 13, 14, 15) is inserted between each conducting sheet (3) and the respective current collector/distributor (7, 21). Such mechanical means may consist in metallic meshes, metallic textiles, interwoven fibers, foraminous sheets or expanded sheets, thin sealing gaskets, sealing gaskets provided with sealing rings on a surface thereof, sealing gaskets made of an elastic material with low elasticity modulus.

28 Claims, 6 Drawing Sheets

METHOD FOR REUSING CURRENT COLLECTORS/DISTRIBUTORS OF SOLID POLYMER ELECTROLYTE FUEL CELL STACKS

This application is a 371 of PCT/EP02/12516 filed Nov. 8, 2002.

The present invention concerns a method for reusing current collectors/distributors of a membrane electrochemical generator.

Processes of conversion of chemical energy to electric energy based on membrane electrochemical generators are widely known in the art.

Figure 1:
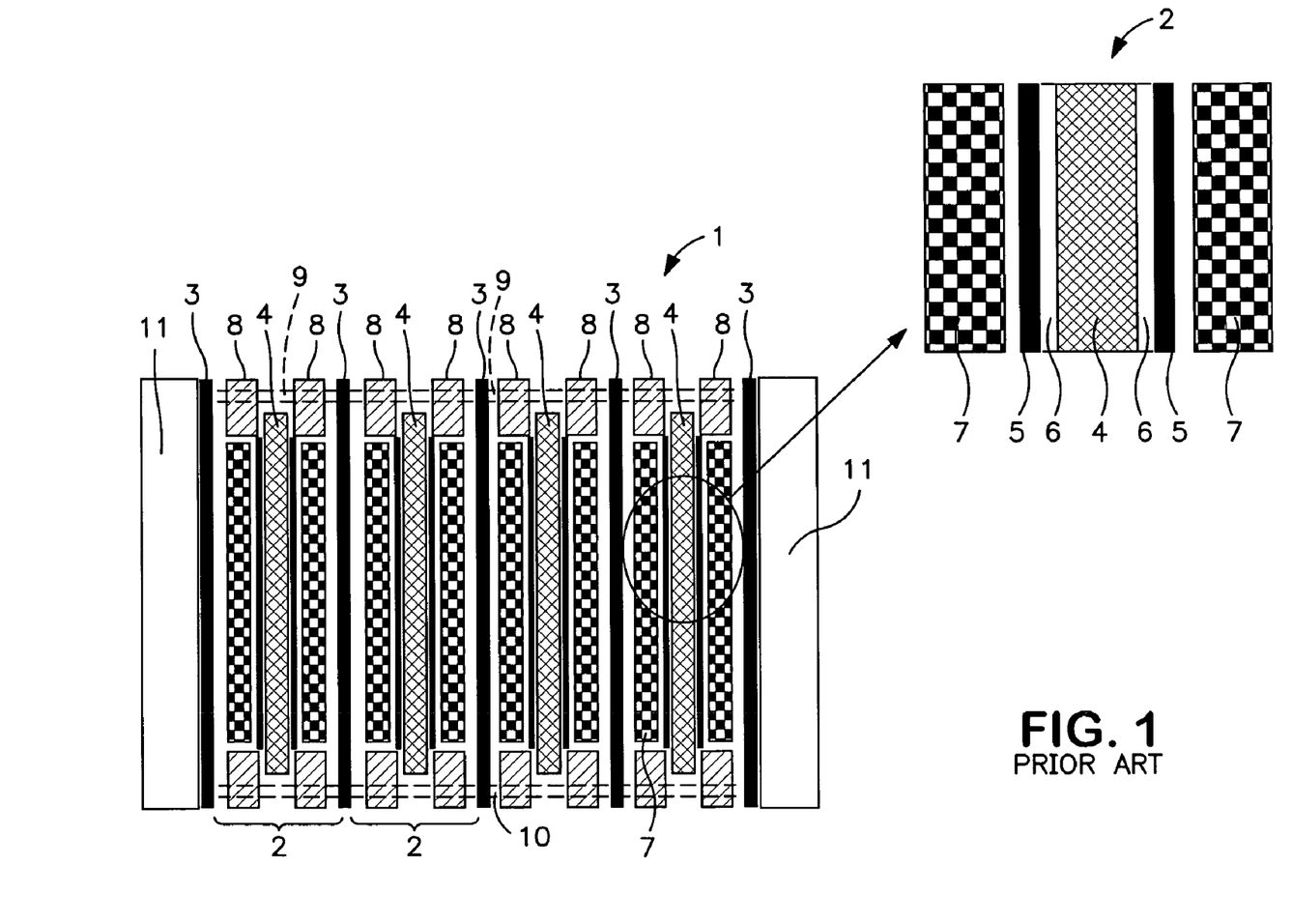
FIG. 1 shows an exploded side-view of a membrane electrochemical generator according to the prior art.

One example of membrane electrochemical generator is shown schematically in FIG. 1. The electrochemical generator (1) consists of a multiplicity of reaction cells (2), having a rather reduced thickness to minimise the bulk, mutually connected in series and assembled according to a filter-press configuration.

Each reaction cell (2) converts the free energy of reaction of a first gaseous reagent (fuel) with a second gaseous reaction (oxidant) without degrading it completely to the state of thermal energy, and thus without being subject to the limitations of Carnot's cycle. The fuel is supplied to the anodic chamber of the reaction cell (2) and consists for instance in a mixture containing hydrogen or light alcohols, such as methanol or ethanol, while the oxidant is supplied to the cathodic chamber of the same cell and is for instance air or oxygen. The fuel is oxidised in the anodic chamber simultaneously releasing H+ ions, while the oxidant is reduced in the cathodic chamber, consuming H+ ions. An ion-exchange membrane which separates the anodic chamber from the cathodic chamber allows the continuous flux of H+ ions from the anodic to the cathodic chamber while hindering the passage of electrons. The voltage thereby established at the poles of the reaction cell (2) is maximised.

More in detail, each reaction cell (2) is limited by a pair of conductive bipolar sheets (3) among which are comprised, from the inside to the outside, the ion-exchange membrane (4); a pair of porous electrodes (5); a pair of catalytic layers (6) deposited at the interface between the membrane (4) and each of the porous electrodes (5); a pair of current collectors/distributors (7) electrically connecting the conductive bipolar sheets (3) to the porous electrodes (5), meanwhile distributing the gaseous reactants; a pair of sealing gaskets (8) aimed at sealing the peripheral part of the reaction cell (2).

In the conductive bipolar sheets (3) and/or in the sealing gaskets (8) of each reaction cell (2) there are holes, not shown in FIG. 1, in connection with the anodic and cathodic chamber by means of distribution channels, also not shown in FIG. 1.

The subsequent matching of these holes leads to the formation of two upper longitudinal manifolds (9) and of two lower longitudinal manifolds (10). The two upper longitudinal manifolds (9), only one of which is shown in FIG. 1, are used for feeding the gaseous reactants (fuel and oxidant) while the two lower longitudinal manifolds (10), only one of which is shown in FIG. 1, are used for withdrawing the reaction products (water) optionally mixed with exhausts (gaseous inerts and unconverted reactants). As an alternative, the lower longitudinal manifolds (10) may be used as feeding manifolds, and the upper longitudinal manifolds (9) as discharge manifolds. It is also possible to feed one of the two gaseous reactants through one of the upper manifolds (9), employing the corresponding lower manifold (10) for discharging, while feeding the second gaseous reactant through the second lower manifold (10) employing the corresponding upper manifold (9) for discharging.

The gaseous reactants are then distributed to each reaction cell (2) through the distribution channels. The reaction products and the possible residual reactants proceeding from each of the reaction cells (2) are also extracted through the distribution channels.

On the outside of the assembly of reaction cells (2) two terminal conductive sheets (11) are present, delimiting the electrochemical generator (1). One of the two terminal conductive sheets (11) is provided with nozzles, not shown in FIG. 1, for the hydraulic connection of the upper and lower longitudinal manifolds (9) and (10).

Moreover, both of the conductive terminal sheets (11) are provided with appropriate holes (also not shown in FIG. 1) for housing tie-rods through which the clamping of the electrochemical generator (1) is achieved.

The electrochemical generator (1), being formed by reaction cells (2) reciprocally connected in series, has the disadvantage of being put out of function if even just one of the reaction cells (2) results defective. By defective reaction cell (2) it is meant a cell in which even just one of the porous electrodes (5) does not function correctly, for instance due to scarce activity of the catalytic layers (6), or in which even just one of the current collectors/distributors (7) does not function, for instance as it shows an excess electric resistance due to incorrect composition or mechanical characteristics, or in which the membrane (4) is punched. This last case is particularly serious as it may allow the mixing of mutually incompatible gaseous reactants.

A known solution to overcome this issue is disclosed in the European Patent 629015 which provides the external short-circuiting of the defective reaction cell (2).

This prior art teaching, although advantageous under several aspects, solves the problem only in part, since it permits the electric current to by-pass the defective reaction cell (2) while failing to eliminate the possible inconveniences associated to the mixing of the gaseous reactants in case the membrane (4) is punched. In fact, the gaseous reactants are anyway present in the defective reaction cell (2) due to the connection between the same and the upper and lower longitudinal manifolds (9) and (10).

It follows that a punched membrane not only hampers the operation of the electrochemical generator (1) but also introduces a relevant safety issue. In case of punched membrane (4), the prior art suggests to couple the external short-circuiting of the defective reaction cell (2) to a hydraulic by-passing of the same as disclosed in U.S. Pat. No. 5,876,583.

The external short-circuiting of the defective reaction cell (2) presents however a further drawback associated to the fact that, in order to carry out this operation, it is necessary that the conductive bipolar sheets (3) be provided with external protrusions.

The presence of such external protrusions entails an increase in weight and bulk of the electrochemical generator (1) which in many applications, particularly in the mobile ones, is definitely detrimental.

To overcome this further inconvenience, another prior art teaching provides the short-circuiting of the defective reaction cell (2) by inserting conductive materials inside recesses effected within the cell itself upon perforating all of the components interposed between the two conductive bipolar sheets (3).

The preferred solution when a reaction cell (2) results defective would be however the replacing or repairing the same after disassembling the electrochemical generator (1), so as to recover the full electric power of the generator.

However, besides requiring lengthy operation times, this procedure would also entail the replacement of all of the current collectors/distributors (7) with rather high costs. In fact, once compressed upon tightening the electrochemical generator (1), the current collectors/distributors (7) would not anymore provide a reliable electric contact with the conductive bipolar sheets (3) and with the membrane-electrode assembly (4, 5) upon clamping the electrochemical generator (1) again.

One of the reasons is the fact that the preferred state-of-the-art current collectors/distributors (7) are not able to recover their original dimensions and characteristics after disassembling the electrochemical generator (1).

Figure 2:
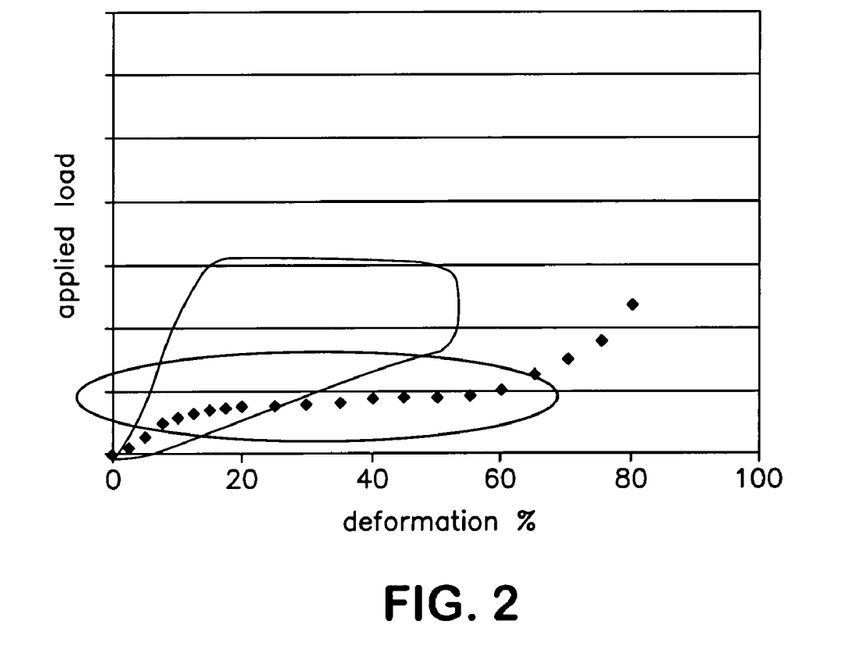
FIG. 2 shows the variation of mechanical parameters relative to the current collectors/distributors present in the electrochemical generator of FIG. 1.

More specifically, as shown in FIG. 2, depending on the pressure applied to the reaction cell (2) the current collectors/distributors (7) show a first stage of reversible elastic deformation with low elastic modulus which is retained until reaching a deformation of 10% of their initial thickness. Thereafter, the current collectors/distributors (7) undergo a rather wide plastic deformation stage (10 to 60% of their initial thickness) wherein the pressure applied to the reaction cell (2) remains substantially constant within the deformation range. The current collectors/distributors (7) finally show a second elastic deformation stage with extremely high elastic modulus once their three-dimensional structure is flattened out.

From experimental investigations it has been observed that the structure of the current collectors/distributors (7) is mechanically spoilt when a deformation of 50% of their initial thickness is exceeded. It is therefore preferred to have current collectors/distributors (7) reaching a plastic-type deformation comprised between 30% and 40% of their initial thickness once the assembling is completed. In this way, a uniform contact pressure close to the optimum operation condition is safely established on the membrane-electrode assembly (4, 5).

Furthermore, using the current collectors/distributors (7) in the plastic deformation range is advantageous as in such conditions the possible thickness irregularities present in both the membrane-electrode assembly (4, 5) and in the same current collectors/distributors are flattened out.

A further advantage is in the possibility of using conductive bipolar sheets (3) of reduced thickness. In such conditions in fact, a possible lack of planarity of the conductive bipolar sheets (3) would not result in a different contact pressure on different portions of the membrane-electrode assembly (4, 5) but only in a different deformation of the current collectors/distributors (7): the optimum operating conditions for the membrane-electrode assembly (4, 5) are thereby guaranteed. The above considerations imply that, should the electrochemical generator (1) be disassembled, the current collectors/distributors (7) would remain plastically deformed.

Figure 3:
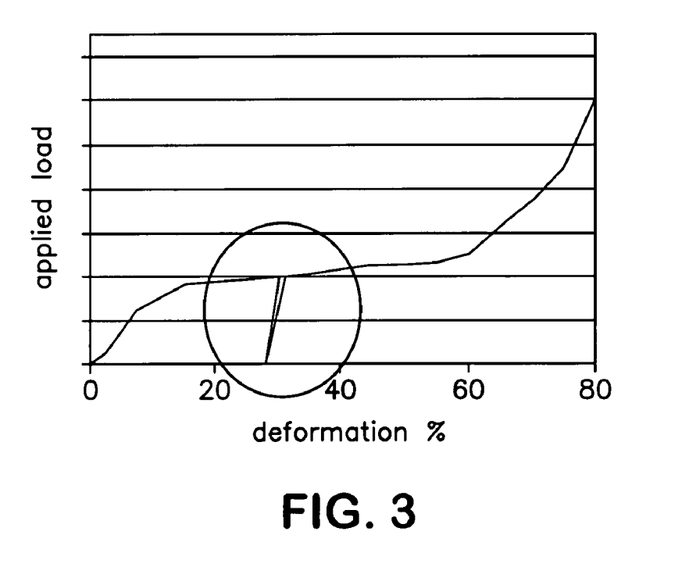
FIG. 3 shows the variation of mechanical parameters relative to the current collectors/distributors present in the electrochemical generator of FIG. 1.

As shown in FIG. 3, once the electrochemical generator (1) is re-tightened, the current collectors/distributors (7) start deforming again as if they hadn't undergone the deformation cycle previously described. Theoretically speaking, such a behaviour would render the current collectors/distributors (7) reusable as, upon imparting them the same deformation, the same contact pressure should be obtained. As a matter of fact however, operating in such a way a bad electric contact is obtained between the different components of the reaction cell (2) resulting in a local increase of the resistive penalties.

The regions where these local resistive penalties build up are subject to quick degradation as a consistent amount of heat is generated therein, eventually leading to the rupture of the membrane (4).

The object of the present invention is to provide a method for reusing current collectors/distributors of a membrane electrochemical generator which is not subject to the described inconveniences.

According to the present invention, a method for reusing current collectors/distributors of a membrane electrochemical generator is accomplished as defined in claim 1.

For a better understanding of the invention, some embodiments thereof are disclosed hereafter as mere non limiting examples and making reference to the attached drawings, wherein.

Making reference to FIG. 1, the method for reusing current collectors/distributors is employed in the electrochemical generator (1).

Such method provides disassembling the electrochemical generator (1) after detecting the presence of a defective reaction cell (2). Subsequently, the method of the invention provides removing the defective cell (2) and reassembling the electrochemical generator (1) reusing the same current collectors/distributors (7) previously employed.

Preferably, additional means for cell thickness adapting, such as metallic spacers, planar gaskets or gasket rings, are inserted in each reaction cell (2) before reassembling the electrochemical generator (1).

The method of the invention will be now illustrated making use of a few examples, which are not however intended as limiting the same.

EXAMPLE 1

Figure 4:
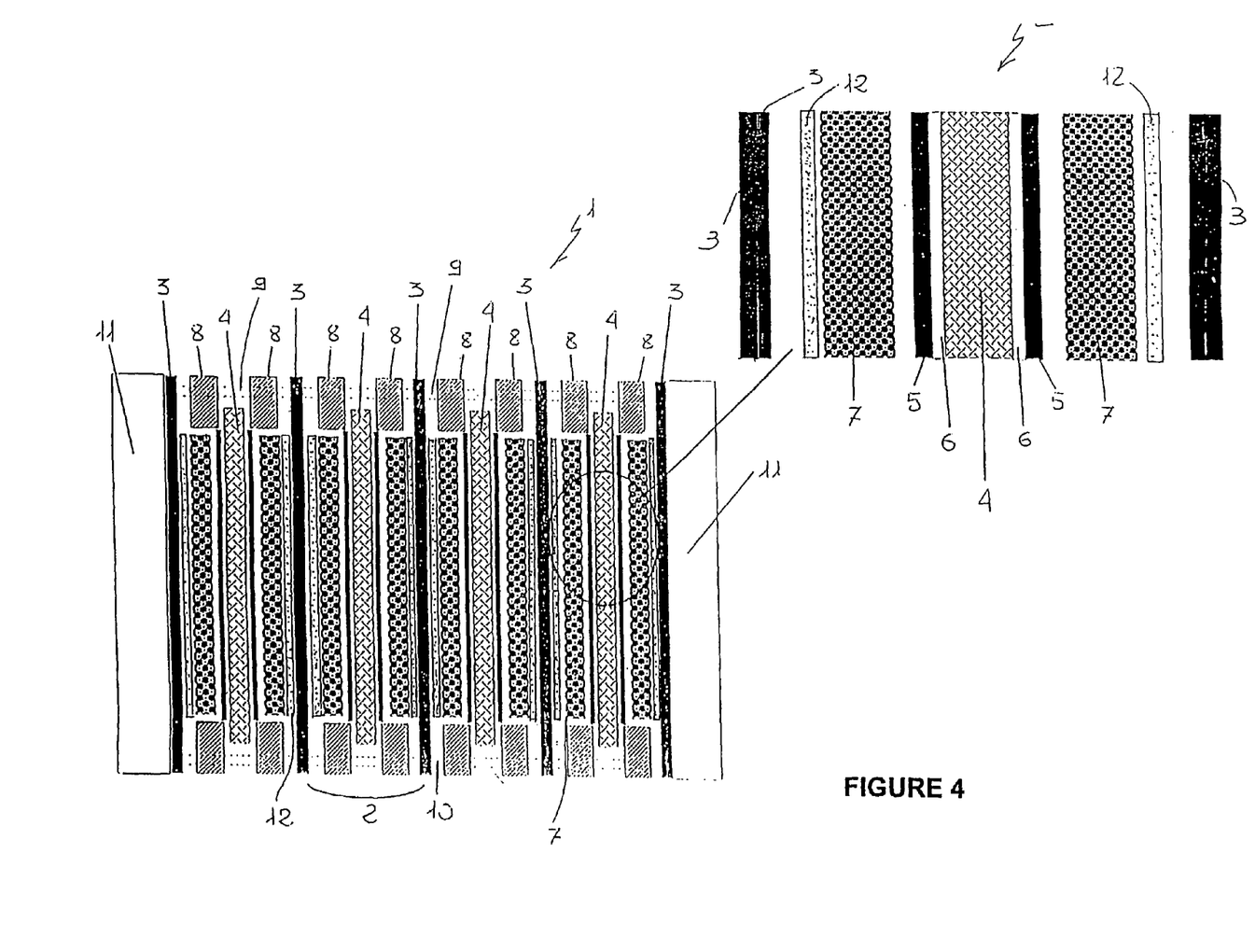
FIG. 4 shows an exploded side-view of a first embodiment of the membrane electrochemical generator according to the invention.

As shown in FIG. 4, when reassembling the electrochemical generator (1), a metallic element (12) of appropriate thickness is inserted as a means for cell thickness adapting both on the anodic and the cathodic side on each reaction cell (2) between the conductive bipolar sheet (3) and the respective reused current collector/distributor (7). In this way, in the course of the subsequent clamping of the electrochemical generator (1), the reused current collector/distributor (7) is forced to undergo a further plastic deformation which adds up to the one already imparted to the same current collector/distributor during the first clamping of the electrochemical generator (1). In such conditions, the mechanical characteristics of the current collector/distributor (7) (see FIG. 3) make it behave as if it were at its first utilisation guaranteeing the optimum operating pressure for the membrane-electrode assembly (4, 5).

In particular, the metallic element (12) may consist in a metallic mesh or, as an alternative, in metallic cloths or fabrics, interwoven fibres, foraminous sheets or expanded sheets.

In particular, the thickness of the metallic element (12) must be calculated such as to impose an overall deformation (i.e. calculated with respect to the original thickness of the same current collector/distributor) lower than 50% to the reused current collector/distributor (7), a limit beyond which the structure of the current collector/distributor (7) is spoiled, as above described.

Experimental observations have shown that, for each reassembling of the electrochemical generator (1), it is sufficient to increase the deformation of the reused current collector/distributor (7) of at least 3% of its initial thickness, in order to achieve a good electric contact between the conductive bipolar sheets (3), the metallic element (12), the reused current collector/distributor (7) and the membrane-electrode assembly (4, 5). In such a way, getting hold of metallic elements (12) of appropriate thickness, it is possible to disassemble and then reassemble the electrochemical generator (1) for maintenance interventions using the same current collectors/distributors (7) for several times.

For instance, using current collectors/distributors (7) with an initial thickness of 3 mm and metallic meshes having an initial thickness of 0.2 mm which is increased by 0.2 mm at each reassembling of the electrochemical generator (1), there is the possibility of reassembling the electrochemical generator (1) no less than four subsequent times making use of the same current collectors/distributors (7).

In more detail:
thickness of current collectors/distributors (7), undeformed: 3 mm;
assembling
thickness of current collectors/distributors (7): 2.4 mm corresponding to a deformation of 20% of their initial thickness;
$1^{st}$ reassembling (use of metallic meshes with a thickness of 0.2 mm)
thickness of current collectors/distributors (7): 2.2 mm corresponding to a deformation of 27% of their initial thickness,
$2^{nd}$ reassembling (use of metallic meshes with a thickness of 0.4 mm)
thickness of current collectors/distributors (7): 2 mm corresponding to a deformation of 33% of their initial thickness;
$3^{rd}$ reassembling (use of metallic meshes with a thickness of 0.6 mm)
thickness of current collectors/distributors (7): 1.8 mm corresponding to a deformation of 40% of their initial thickness;
$4^{th}$ reassembling (use of metallic meshes with a thickness of 0.8 mm)
thickness of current collectors/distributors (7): 1.6 mm corresponding to a deformation of 47% of their initial thickness.

The construction material of the metallic element (12) can optionally be the same of the current collectors/distributors (7) or the same of the conductive bipolar sheets (3) or a third material. In particular, the type of material to be employed must be evaluated each time with the aim of maintaining a good electric contact between the metallic elements (12), the conductive bipolar sheets (3) and the current collectors/distributors (7), and depending on the resistance to corrosion of the metallic element itself. Commonly employed materials are steels, aluminium and alloys thereof, titanium, nickel and alloys thereof. In some cases these materials may be superficially treated in order to decrease the contact resistances between the different components or to increase the corrosion resistance of the metallic element (12).

EXAMPLE 2

Figure 5:
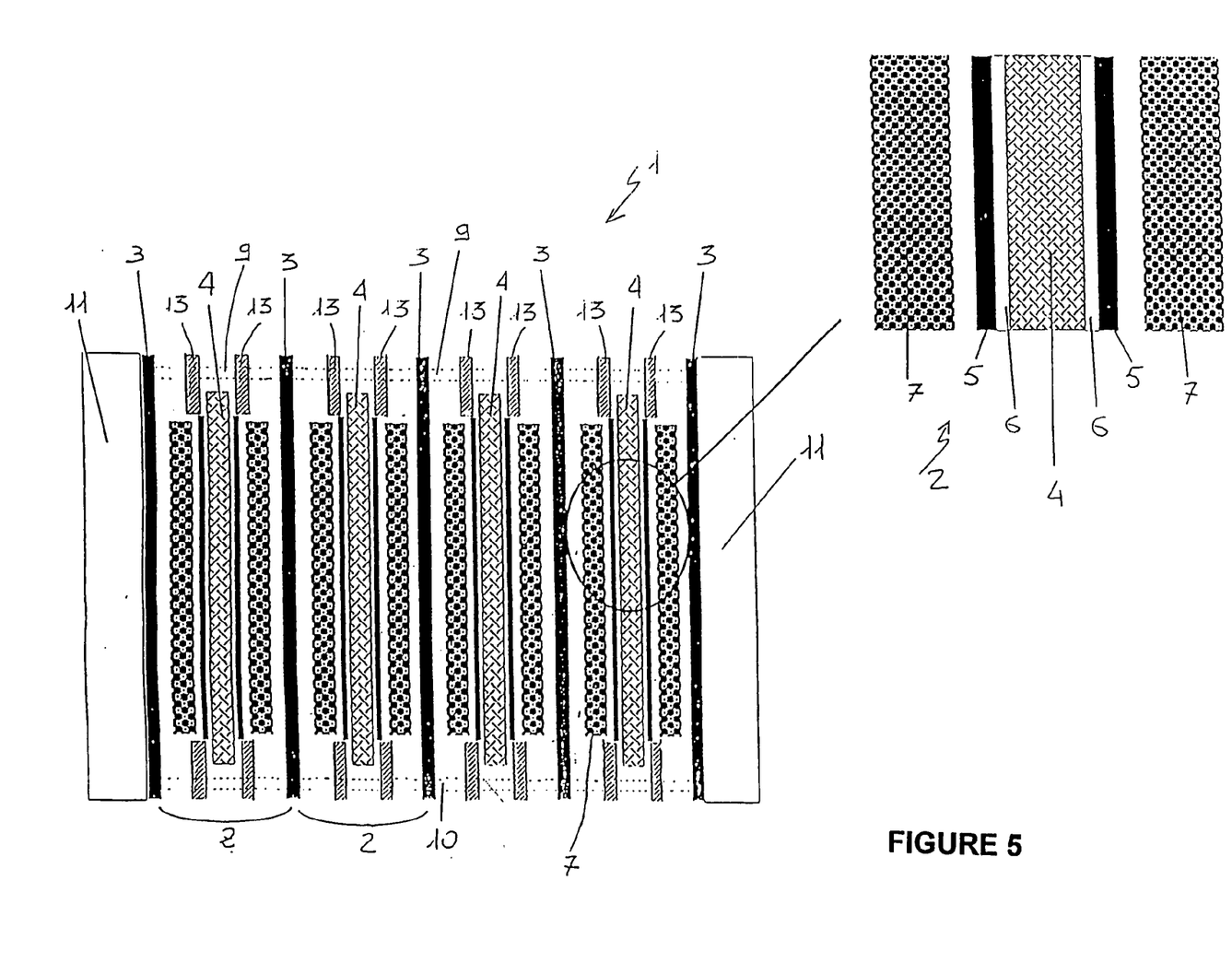
FIG. 5 shows an exploded side-view of a second embodiment of the membrane electrochemical generator of FIG. 1.

As shown in FIG. 5, when reassembling the electrochemical generator (1), the sealing gaskets (8) are replaced with thin sealing gaskets (13) having a thickness lower than that of the sealing gaskets (8) just enough to impart a sufficient plastic deformation to the current collectors/distributors (7) during the reassembling of the electrochemical generator (1) so as to ensure a good electric contact with the membrane-electrode assembly (4, 5) and with the conductive bipolar sheets (3). In particular, it is sufficient to increase the deformation of the current collectors/distributors (7) of at least 3% of their initial thickness. For instance, when using 2.1 mm thick sealing gaskets (8), which is a rather typical value, the thin sealing gaskets (13) should have a thickness at least 0.1÷0.2 mm lower.

EXAMPLE 3

Figure 6A:
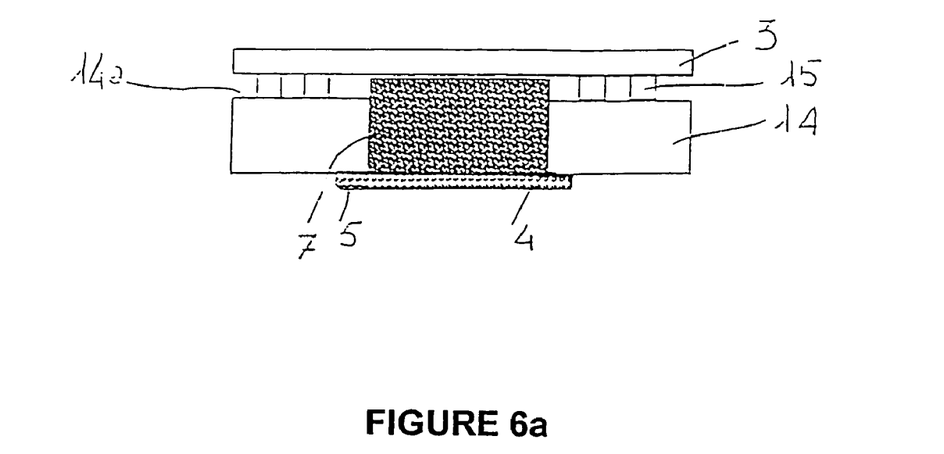
FIGS. 6a-6b show components of a third embodiment of the electrochemical generator of FIG. 1.
Figure 6B:
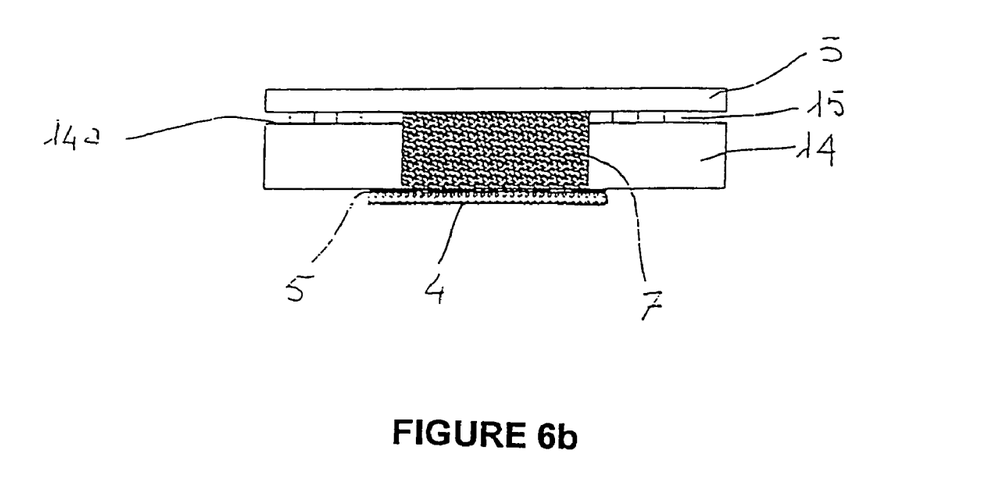

Should the electrochemical generator (1) be provided with sealing gaskets (14) made of thermoplastic material and provided on a surface thereof (14a) of sealing rings (15) capable of undergoing a plastic deformation, when reassembling the same electrochemical generator it is possible, by slightly increasing the clamping pressure, to deform the current collectors/distributors (7) just enough (for instance up to a value not lower than 3% of the initial thickness) to achieve a good electric contact with the membrane-electrode assembly (4, 5) and with the conductive electric sheets (3). In fact, when the electrochemical generator (1) is clamped, it's only the sealing rings (15) that get in contact with the conductive bipolar sheets (3). The sealing rings (15) are capable, upon deforming, to ensure the sealing of the gaseous reactants.

As shown more in detail in FIG. 6a, during the first clamping of the electrochemical generator (1) the sealing rings (15) are not completely deformed, so that the distance between the conductive bipolar sheets (3) and the membrane-electrode assembly (4, 5) is higher than in the second clamping of the electrochemical generator (1) (FIG. 6b), wherein the sealing rings (15) and thus the current collector/distributor (7) are forced to undergo a higher deformation.

The sealing rings (15) may be stamped co-operatively with the sealing gasket (14) or may be made of a different superposed material, more suitable for avoiding the leakage of the gaseous reactants and more deformable than that of the gasket bulk (for instance silicons, rubbers).

EXAMPLE 4

When reassembling the electrochemical generator (1) it is possible to reuse current collectors/distributors (7) having a mechanically rigid structure only if the sealing gaskets (8) are made of an elastic material with low elasticity modulus. Only in this case, in fact, the overall applied pressure is mostly distributed on the current collectors/distributors (7) and to a much lesser extent on the sealing gaskets (8), giving rise to the possibility of varying the compression of the membrane-electrode assembly (4, 5) so as to obtain optimum operating values for each of the reaction cells (2). Rigid type current collectors/distributors (7) are metallic foams, sintered materials, metallic meshes or expanded sheets; construction materials suited to the fabrication of the sealing gaskets (8) are essentially rubbers, such as EPDM, nitrile (NBR) rubber, fluorinated products, Santoprene® thermoplastic rubber, the latter being a trademark of Advanced Elastomer Systems, USA. As the current collector/distributor (7) is rigid no problems arise when a subsequent reassembling of the electrochemical generator (1) is carried out since the current collector/distributor (7) does not undergo any plastic-type deformation.

It is finally evident that several modifications and variations can be made to the disclosed method, without departing from the domain of the present invention.

Figure 7:
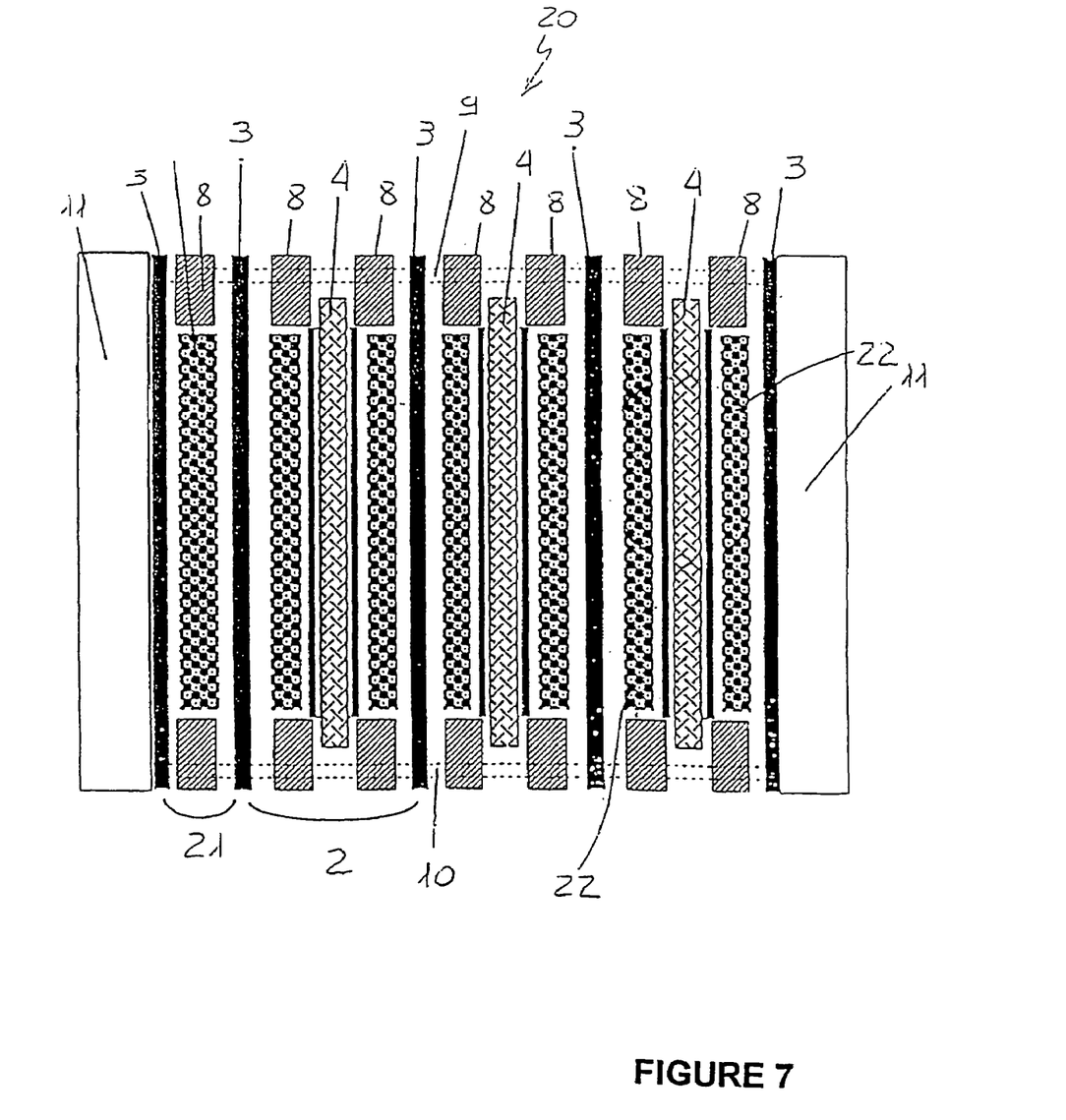
FIG. 7 shows an exploded side-view of a fourth embodiment of the membrane electrochemical generator of FIG. 1.

For example, although the method of the invention was described for use in an electrochemical generator (1) comprising only reaction cells (2), such method can be equally applied to an electrochemical generator (20) comprising cooling cells (21) interposed between any pair of reaction cells (2), as shown in FIG. 7 wherein the different parts of the electrochemical generator (20) are indicated with the same reference numerals that were used in FIG. 1. The cooling cells (21) are equivalent to the reaction cells (2) except they do not comprise the electrochemical package consisting in the ion-exchange membrane (4), the porous electrodes (5) and the catalytic layers (6).

In this case, making use of the method of the invention also the current collectors/distributors (22) of the cooling cells (21) may be reused in a subsequent reassembling of the electrochemical generator (20).

As an alternative, only in the cooling cells (21) current collectors/distributors (22) having elastic characteristics may be used. In this case, the method of the invention will be applied only to the current collectors/distributors (7) present in the reaction cells (2) as the current collectors/distributors (22) present in the cooling cells (21), undergoing no permanent deformation, may be reused as such.

The invention claimed is:

1. A method for reusing current collectors/distributors of a membrane electrochemical generator comprising a multiplicity of elementary cells assembled in a filter-press configuration, said plurality of reaction cells comprising an array of conducting sheets and of current collectors/distributors, comprising the steps of:
    detecting the presence of a damaged reaction cell;
    disassembling said electrochemical generator;
    repairing/replacing said damaged reaction cell; and
    reassembling said electrochemical generator reusing the same current collectors/distributors.

2. The method of claim 1, wherein said step of reassembling said electrochemical generator comprises the step of inserting at least one mechanical means for cell thickness adapting between each conductive sheet and the respective current collector/distributor.

3. The method of claim 2, wherein said at least one mechanical means for cell thickness adapting comprises a mechanical element having a thickness capable of imparting a plastic-type deformation to said respective current collector/distributor.

4. The method of claim 3, wherein said mechanical element is a metallic mesh.

5. The method of claim 4, wherein said metallic mesh is made of an electrically conductive and corrosion resistant material selected from the group consisting of steel, aluminum and alloys thereof, titanium, and nickel and alloys thereof.

6. The method of claim 5, wherein said electrically conductive and corrosion resistant material is superficially treated.

7. The method of claim 3, wherein said mechanical element is a metallic cloth or fabric.

8. The method of claim 7, wherein said cloths or fabrics are made of an electrically conductive, corrosion resistant material selected from the group consisting of steel, aluminum and alloys thereof, titanium, and nickel and alloys thereof.

9. The method of claim 8, wherein said electrically conductive corrosion resistant material is superficially treated.

10. The method of claim 3, wherein said mechanical element consists of interwoven fibers.

11. The method of claim 10, wherein said interwoven fibers are made of an electrically conductive and corrosion resistant material selected from the group consisting of steel, aluminum and alloys thereof, titanium, and nickel and alloys thereof.

12. The method of claim 11, wherein said electrically conductive and corrosion resistant material is superficially treated.

13. The method of claim 3, wherein said mechanical element is a foraminous sheet.

14. The method of claim 13, wherein said foraminous sheet is made of an electrically conductive and corrosion resistant material selected from the group consisting of steel, aluminum and alloys thereof, titanium, and nickel and alloys thereof.

15. The method of claim 14, wherein said electrically conductive and corrosion resistant material is superficially treated.

16. The method of claim 3, wherein said mechanical element is an expanded sheet.

17. The method of claim 16, wherein said expanded sheet is made of an electrically conductive and corrosion resistant material selected from the group consisting of steel, aluminum and alloys thereof, titanium, and nickel and alloys thereof.

18. The method of claim 17, wherein said electrically conductive and corrosion resistant material is superficially treated.

19. The method of claim 2, wherein said at least one mechanical means for cell thickness adapting comprising thin sealing gaskets having a thickness such as to impart a plastic-type deformation to said current collector/distributor at least 3% of the initial thickness of said respective current collector/distributor.

20. The method of claim 19, wherein said thickness of said thin sealing gaskets is comprised between 0.1 and 0.2 mm.

21. The method of claim 2, wherein said mechanical means for cell thickness adapting comprises sealing gaskets provided with sealing rings on a surface thereof having a thickness such as to impart a plastic-type deformation to said respective current collector/distributor of at least 3% of the initial thickness of said respective current collector/distributor.

22. The method of claim 21, wherein said sealing rings are superposed on said surface of said sealing gaskets.

23. The method of claim 21, wherein said sealing rings are stamped co-operatively on said surface of said sealing gaskets.

24. The method of claim 21, wherein said sealing rings are made of a material comprising silicone or rubber.

25. The method of claim 2 wherein said current collectors/distributors have a mechanically rigid structure and said at least one mechanical means for cell thickness adapting comprise sealing gaskets made of an elastic material with low elasticity modulus.

26. The method of claim 25, wherein said elastic material with low elasticity modulus is selected from the group consisting of ethylene propylene diene rubber, nitrile butadiene rubber and fluorinated products.

27. The method of claim 25, wherein said current collectors/distributors are made of a material selected from the group consisting of metallic foams, sintered materials, metallic meshes and expanded sheets.

28. The method of claim 1 wherein said reaction cells comprise cooling cells.

* * * * *

UNITED STATES PATENT AND TRADEMARK OFFICE
CERTIFICATE OF CORRECTION

| | | |
|---|---|---|
| PATENT NO. | : 7,294,428 B2 | Page 1 of 1 |
| APPLICATION NO. | : 10/493930 | |
| DATED | : November 13, 2007 | |
| INVENTOR(S) | : Merlo et al. | |

It is certified that error appears in the above-identified patent and that said Letters Patent is hereby corrected as shown below:

On the title page, item (57), line 12, "to" should read --To--.

In claim 1, column 7, line 39, "elementary" should read --reaction--.

Signed and Sealed this

Eighteenth Day of November, 2008

JON W. DUDAS
*Director of the United States Patent and Trademark Office*